(12) United States Patent
Holec

(10) Patent No.: US 6,486,963 B1
(45) Date of Patent: Nov. 26, 2002

(54) PRECISION 3D SCANNER BASE AND METHOD FOR MEASURING MANUFACTURED PARTS

(75) Inventor: Henry V. Holec, Mendota Heights, MN (US)

(73) Assignee: PPT Vision, Inc., Eden Prairie, MN (US)

( * ) Notice: Subject to any disclaimer, the term of this patent is extended or adjusted under 35 U.S.C. 154(b) by 0 days.

(21) Appl. No.: 09/597,795

(22) Filed: Jun. 20, 2000

(51) Int. Cl.$^7$ .............................................. G01B 11/24

(52) U.S. Cl. ..................... 356/601; 356/608; 356/611

(58) Field of Search .............................. 356/601, 608, 356/611

(56) References Cited

U.S. PATENT DOCUMENTS

| | | | | |
|---|---|---|---|---|
| 3,069,654 | A | 12/1962 | Hough | 340/146.3 |
| 4,212,073 | A | 7/1980 | Balasubramanian | 364/562 |
| 4,370,300 | A | 1/1983 | Mori et al. | |
| 4,639,139 | A | 1/1987 | Wyant et al. | 356/359 |
| 4,641,972 | A | 2/1987 | Halioua et al. | 356/376 |
| 4,705,395 | A | 11/1987 | Hageniers | |
| 4,729,536 | A | * 3/1988 | Scala | 108/143 |
| 4,965,665 | A | 10/1990 | Amir | 358/101 |
| 4,967,066 | A | 10/1990 | Beraldin et al. | |
| 4,967,284 | A | 10/1990 | Yoshida et al. | 358/300 |
| 4,991,968 | A | 2/1991 | Yonescu et al. | |

(List continued on next page.)

FOREIGN PATENT DOCUMENTS

| | | | | |
|---|---|---|---|---|
| EP | 0638801 | 2/1995 | | G01N/21/88 |
| WO | 98/02716 | 1/1998 | | G01B/11/03 |

OTHER PUBLICATIONS

Ballard, D.H., "Generalizing the Hough Transform to Detect Arbitrary Shapes", *Pattern Recognition, 13* (2), Pergamon Press, pp. 183–194, (1981).

Davies, E.R., *Machine Vision: Theory, Algorithms, Practicalities, 2nd Edition*, Academic Press, San Diego, pp. 195–210, (1997).

Yang, H.S., et al., "Determination of the identity, position and orientation of the topmost object in a pile: some further experiments", *IEEE International Conference on Robotics and Automation, 1*, San Francisco. CA, 293–298, (1986).

*Primary Examiner*—Frank G. Font
*Assistant Examiner*—Roy M. Punnoose
(74) *Attorney, Agent, or Firm*—Schwegman, Lundberg, Woessner & Kluth, P.A.

(57) ABSTRACT

In the context of a machine-vision system for inspecting a part, a method and apparatus to provide high-speed high accuracy 3D (three-dimensional) inspection of manufactured parts by reducing vibration. One system includes a machine-base unit and a table-base portion supported by the base unit. At least two upright portions are connected to the table-base portion. A first scanner support is coupled to the upright portions. An imager head is coupled to the scanner support, wherein the scanner support moves the imager head in a linear motion to scan the object. A connecting member including at least one vibration-absorbing portion connects to the upright portions to absorb vibrations of the upright portions. Also described is a method of reducing vibration in a three-dimensional scanning apparatus used to determine a geometry of an object having at least one surface to be measured, the scanning apparatus having two or more upright portions and a scanning mechanism coupled the upright portions for moving an imaging head. The method includes supporting the scanning mechanism on the upright portions, dampening vibrations of the upright portions, scanning the imaging head relative to the object, receiving image signals representing a three-dimensional geometry of the object into a computer, and calculating with the computer object-geometry data representing three-dimensional geometry of the object.

22 Claims, 9 Drawing Sheets

U.S. PATENT DOCUMENTS

| | | | | |
|---|---|---|---|---|
| 5,060,065 A | | 10/1991 | Wasserman | 358/106 |
| 5,085,502 A | | 2/1992 | Womack et al. | 356/376 |
| 5,251,156 A | * | 10/1993 | Heier et al. | 33/503 |
| 5,285,397 A | * | 2/1994 | Heier et al. | 33/503 |
| 5,355,221 A | | 10/1994 | Cohen et al. | 356/359 |
| 5,379,107 A | | 1/1995 | Hanssen et al. | |
| 5,398,113 A | | 3/1995 | de Groot | 356/360 |
| 5,426,302 A | * | 6/1995 | Marchman et al. | 250/306 |
| 5,465,152 A | | 11/1995 | Bilodeau et al. | 356/371 |
| 5,546,189 A | | 8/1996 | Svetkoff et al. | 356/376 |
| 5,561,525 A | | 10/1996 | Toyonaga et al. | 356/360 |
| 5,636,025 A | | 6/1997 | Bieman et al. | 356/374 |
| 5,646,733 A | | 7/1997 | Bieman | 356/376 |
| 5,680,215 A | | 10/1997 | Huber et al. | 356/371 |
| 5,719,952 A | | 2/1998 | Rooks | |
| 5,745,176 A | | 4/1998 | Lebens | 348/370 |
| 5,753,903 A | | 5/1998 | Mahaney | |
| 5,859,698 A | | 1/1999 | Chau et al. | |
| 5,943,125 A | | 8/1999 | King et al. | |
| 6,022,124 A | | 2/2000 | Bourn et al. | |
| 6,069,701 A | | 5/2000 | Hashimoto et al. | |
| 6,072,898 A | | 6/2000 | Beaty et al. | |
| 6,173,070 B1 | | 1/2001 | Michael et al. | |
| 6,181,472 B1 | | 1/2001 | Liu | |
| 6,222,187 B1 | | 4/2001 | Shivanandan | |
| 6,249,347 B1 | | 6/2001 | Svetkoff et al. | |
| 6,260,000 B1 | | 7/2001 | Karasaki et al. | |
| 6,282,462 B1 | | 8/2001 | Hopkins | |

* cited by examiner

PRECISION 3D SCANNER BASE AND METHOD FOR MEASURING MANUFACTURED PARTS

RELATED APPLICATIONS

This invention is related to:

U.S. patent application Ser. No. 09/350,051, entitled "CIRCUIT FOR MACHINE-VISION SYSTEM", filed Jul. 8, 1999, now pending.

U.S. patent application Ser. No. 09/350,050, entitled "MACHINE-VISION SYSTEM AND METHOD FOR RANDOMLY LOCATED PARTS", filed Jul. 8, 1999, now abandoned.

U.S. patent application Ser. No. 09/350,255, entitled "PARTS MANIPULATION AND INSPECTION SYSTEM AND METHOD", filed Jul. 8, 1999, now abandoned.

U.S. patent application Ser. No. 09/349,684, entitled "MACHINE-VISION SYSTEMS AND METHODS WITH UP AND DOWN LIGHTS", filed Jul. 8, 1999, now pending.

U.S. patent application Ser. No. 09/349,948, entitled "METHOD AND APPARATUS TO CALCULATE BGA BALL TOPS", filed Jul. 8, 1999, now pending.

U.S. patent application Ser. No. 09/350,049, entitled "COMBINED 3D- AND 2D-SCANNING MACHINE-VISION SYSTEM AND METHOD", filed Jul. 8, 1999, now pending.

U.S. patent application Ser. No. 09/350,037, entitled "MACHINE-VISION SYSTEM AND METHOD HAVING A SINE-WAVE PROJECTION PATTERN", filed Jul. 8, 1999, now abandoned.

U.S. patent application Ser. No. 09/350,251, entitled "TRAY FLIPPER AND METHOD FOR PARTS INSPECTION", filed Jul. 8, 1999, now pending.

U.S. patent application Ser. No. 09/598,069, entitled "BINARY GRATING AND METHOD FOR GENERATING A MOIRE PATTERN FOR 3D IMAGING", filed on even date herewith, and now pending.

U.S. patent application Ser. No. 09/597,865, entitled 3D SCANNER AND METHOD FOR MEASURING HEIGHTS AND ANGLES OF MANUFACTURED PARTS", filed on even date herewith, now pending.

which are all assigned to a common assignee, and which are incorporated herein by reference.

FIELD OF THE INVENTION

This invention relates to the field of machine vision, and more specifically to a method and precision apparatus of obtaining three-dimensional inspection data for manufactured parts in a manufacturing environment.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1998–2000, PPT Vision, Inc., All Rights Reserved.

BACKGROUND OF THE INVENTION

There is a widespread need for inspection data for electronic parts in a manufacturing environment. One common inspection method uses a video camera to acquire two-dimensional images of a device-under-test.

Height distribution of a surface can be obtained by projecting a light-stripe pattern onto the surface and then re-imaging the light pattern that appears on the surface.

One technique for extracting this information based on taking multiple images (3 or more) of the light pattern that appears on the surface while shifting the position (phase) of the projected light stripe pattern is referred to as phase shifting interferometry, as disclosed in U.S. Pat. Nos. 4,641,972 and 4,212,073 (incorporated herein by reference).

The multiple images are usually taken using a CCD (charge-coupled device) video camera with the images being digitized and transferred to a computer where phase-shift analysis, based on images being used as "buckets," converts the information to a contour map (i.e., a three-dimensional representation) of the surface.

The techniques used to obtain the multiple images are based on methods that keep the camera and viewed surface stationary with respect to each other while moving the projected pattern.

One technique for capturing just one bucket image using a line scan camera is described in U.S. Pat. No. 4,965,665 (incorporated herein by reference).

U.S. Pat. No. 5,398,113 and 5,355,221 (incorporated herein by reference) disclose white-light interferometry systems which profile surfaces of objects.

In U.S. Pat. No. 5,636,025 (incorporated herein by reference), an optical measuring system is disclosed which includes a light source, gratings, lenses, and camera. A mechanical translation device moves one of the gratings in a plane parallel to a reference surface to effect a phase shift of a projected image of the grating on the contoured surface to be measured. A second mechanical translation device moves one of the lenses to effect a change in the contour interval. A first phase of the points on the contoured surface is taken, via a four-bucket algorithm, at a first contour interval. A second phase of the points is taken at a second contour interval. A control system, including a computer, determines a coarse measurement using the difference between the first and second phases. The control system further determines a fine measurement using either the first or second phase. The displacement or distance, relative to the reference plane, of each point is determined, via the control system, using the fine and coarse measurements.

Current vision inspection systems have many problems. Among the problems are assorted problems associated with the mechanical translation devices used with the vision inspection systems to handle the devices under inspection. One problem is that vision systems typically take up a large amount of linear space on a manufacturing line. Typically small devices, such as disk-drive suspensions, are placed in standard trays, to facilitate the handling of the small devices. In other cases, the disk-drive suspensions are manufactured from a continuous strip of thin metal, wherein at least a portion of the strip is maintained, with other portions cut away to form the suspensions, thus leaving the suspensions attached to the remaining strip. The suspensions can bend at various angles relative to the strip they are attached to. This strip is then used to facilitate the handling of the suspensions, such as positioning the suspensions under a machine-vision head at an inspection station. The exact positioning of the suspensions in their trays, or their relative orientation to the strip can vary, putting demands on the machine-vision system to determine the orientation and angle of the parts relative to the machine-vision head.

Conventional 3D imaging systems and methods have difficulty in obtaining both speed and accuracy. The support and motion control of the scanning head relative to the parts being scanned present substantial challenges. In particular, vibration problems as well as difficulty in maintaining tight tolerances of scan height across the length of the scan motion make it difficult to obtain accurate measurements of very small parts or parts having a requirement for extreme precision in 3 dimensional geometric measurements.

To overcome the problems stated above as well as other problems, there is a need for a method and precision apparatus of obtaining three-dimensional inspection data for manufactured parts in a manufacturing environment.

SUMMARY OF THE INVENTION

In the context of a machine-vision system for inspecting a part, this invention includes method and apparatus to provide high-speed 3D (three-dimensional) inspection of manufactured parts. In some embodiments, precision stamped, formed, and/or laser-cut metal parts are inspected to obtain dimensional and geometric information regarding such characteristics as sag or bow of subportions of the item, the angle of pitch, yaw, and or roll of one portion relative to another, heights of various formations on the part. In some embodiments, this invention includes method and apparatus to provide high-speed 3D inspection of manufactured parts.

One aspect of the present invention provides a machine-vision system for inspecting an object. The system includes a machine-base unit and a table-base portion supported by the base unit. At least two upright portions are connected to the table-base portion. A first scanner support is coupled to the upright portions. An imager head is coupled to the scanner support, wherein the scanner support moves the imager head in a linear motion to scan the object. A connecting member including at least one vibration-absorbing portion connects to the upright portions to absorb vibrations of the upright portions.

Another aspect of the present invention provides a method of reducing vibration in a three-dimensional scanning apparatus used to determine a geometry of an object having at least one surface to be measured, the scanning apparatus having two or more upright portions and a scanning mechanism coupled the upright portions for moving an imaging head. The method includes supporting the scanning mechanism on the upright portions, dampening vibrations of the upright portions, scanning the imaging head relative to the object, receiving image signals representing a three-dimensional geometry of the object into a computer, and calculating with the computer object-geometry data representing three-dimensional geometry of the object.

DETAILED DESCRIPTION OF THE PREFERRED EMBODIMENT

Figure 1:
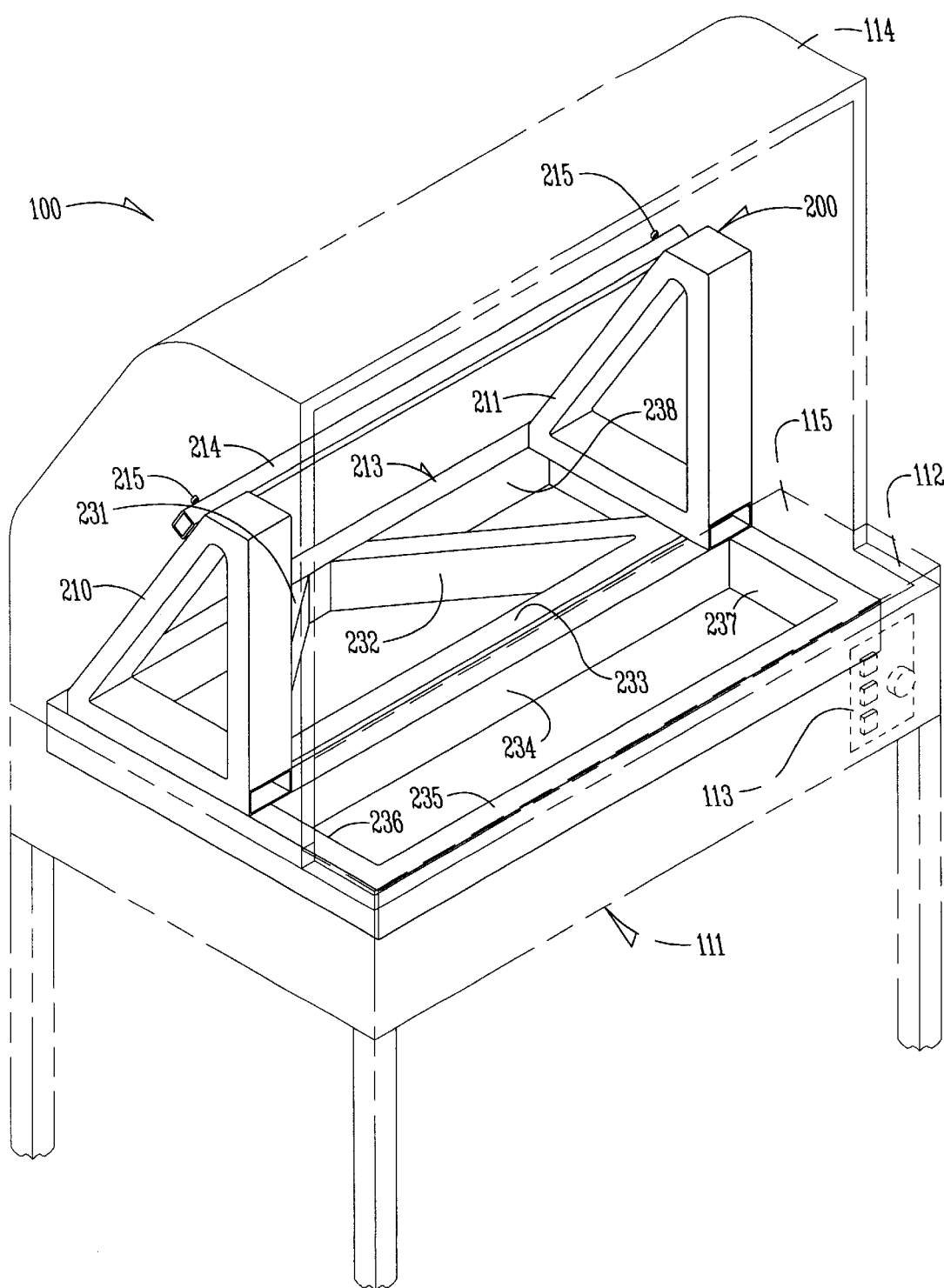
FIG. 1 shows an isometric view an embodiment of the present invention, a scanner frame 100 for the manufacture and inspection of devices.

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Machine-vision and optical-feature-recognition techniques can be used to distinguish parts that deviate from a predetermined intended aspect of an ideal device. In this description, a "device" is meant to be any device of manufacture or object, for example an integrated circuit package, electronic part, semiconductor, molded plastic part, aluminum wheel, gemstone or even an egg or strawberry, which can be inspected. Typically, according to the present invention, a manufacturing operation will use two-dimensional and three dimensional information, along with measured angles of respective portions of the parts acquired from inspection of the device to distinguish "good" parts from "bad" parts, and can discard the bad parts and insert previously inspected good parts in their place. In some embodiments, the devices under test are placed into pocketed trays or into cartons for ease of handling and transport, and inspection will take place of the devices while the devices are in the pocketed trays, according to the present invention.

U.S. Pat. No. 5,646,733 to Bieman (incorporated herein by reference) describes a method and system that include an optical head which is moved relative to an object at a machine-vision station. A projected pattern of light (e.g., a pattern of stripes or lines) is scanned across the surface of an object to be inspected to generate an imagable light signal to acquire three-dimensional information associated with the object. The optical head includes at least one pattern projector which projects a pattern of lines and an imaging subsystem which includes a trilinear-array camera as a detector. The camera and the at least one pattern projector are maintained in fixed relation to each other. The trilinear-array camera includes three linear detector elements, each having for example about 1000 to 4000 pixels, which extend in a direction parallel with the pattern of lines. The geometry of the optical head is arranged in such a way that each linear detector element picks up a different phase in the line pattern. As the optical head is scanned across the surface of interest, the detector elements are continuously read out. Depth at each point on the surface is calculated from the intensity readings obtained from each of the detector elements that correspond to the same point on the surface. In this way, the phases of the pattern are calculated from the three intensity readings obtained for each point.

As described herein, the term "light" is meant to encompass any electromagnetic radiation including visible, infrared, and/or ultraviolet wavelengths, whether or not it is polarized, monochromatic, coherent, or modulated. Some embodiments use monochromatic light, while other embodiments use light having a range of wavelengths. Some embodiments use coherent light such as from a laser source. Some embodiments use polarized light, while others do not. Some embodiments used light whose intensity varies with time (such as pulsed light illumination to freeze motion), while other embodiments use DC light.

System Overview

FIG. 1 shows an isometric view an embodiment of the present invention, a scanner frame 100 for the manufacture and inspection of devices. Scanner frame 100 includes a base unit 111 that supports the rest of the unit, for example, on a manufacturing floor. Optical table unit 200 is attached to and vibration-isolated from base unit 111. In some embodiments, optical table unit 200 is made very heavy, in order that its inertia is hard to move (reducing received vibrations or bumps, and is floated on rubber mounts that attach it to base unit 111, that reduce vibrations transmitted from the base unit. Base unit 111 typically includes casters, wheels, or feet on the bottom. A table-base portion 213 of optical table unit 200 is supported by the base unit 111. In some embodiments, table-base portion 213 is fabricated of welded rectangular steel tubing, including four outside members: front member 235, left-side member 236, right-side member 237, back member 230; two central supports 233 and 234 welded to one another, and two diagonal inner support members 231 and 232. Left upright portion 210 and right upright portion 211 are welded to table-base portion 213. In one embodiment, table-base portion 213 is substantially horizontal and upright portions 210 and 211 are substantially vertical in orientation. In some embodiments, a scanner support 549 (including support bar 540 and scanner shuttle 541) is coupled to the front of upright portions 210 and 211 (see FIG. 5). An imager head 520 coupled to the scanner shuttle 541 which moves on scanner support 540, wherein the scanner support 549 moves the imager head in a linear motion to scan the object being measured.

Figure 3:
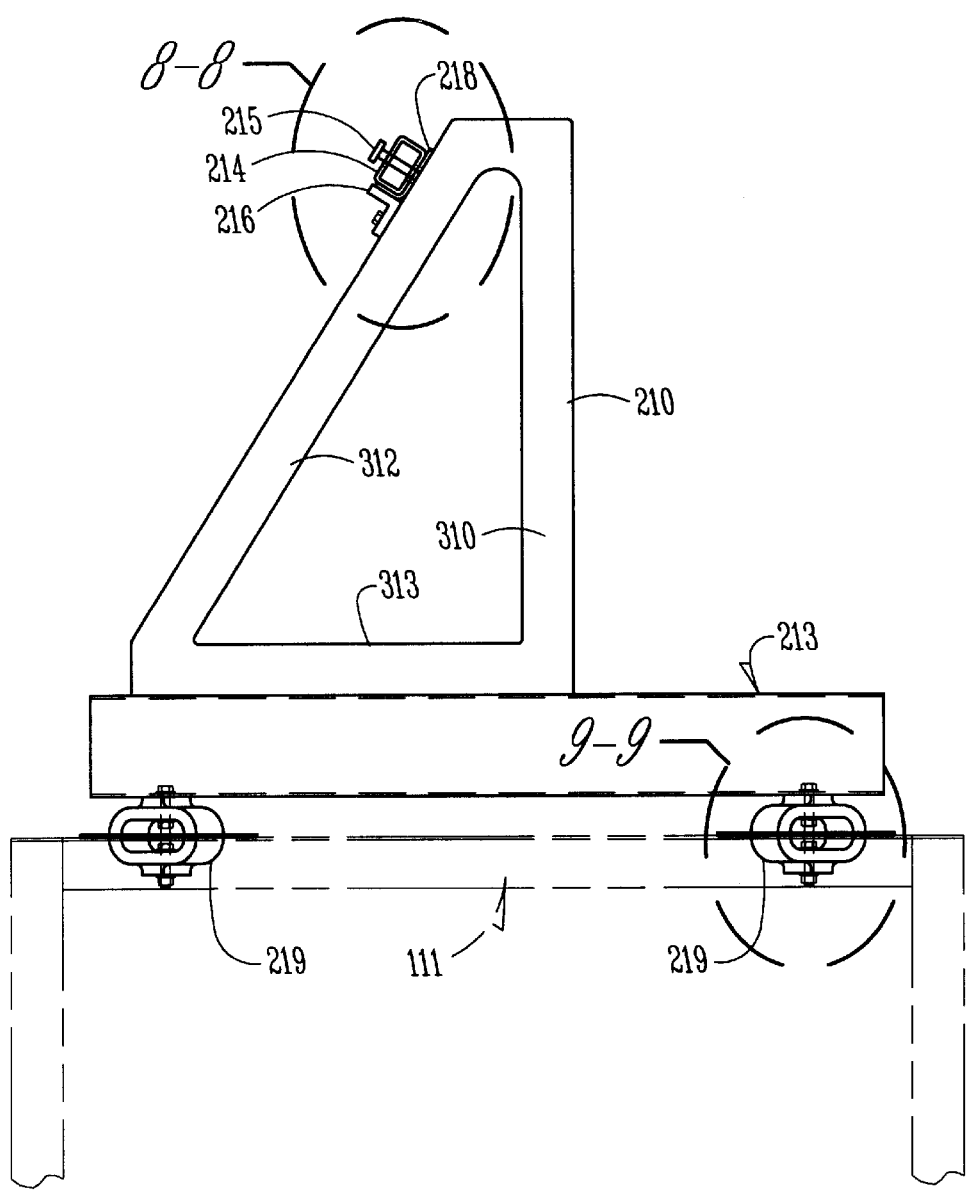
FIG. 3 shows a left-side view of vibration-isolated optical table unit 200.
Figures 8, 9:
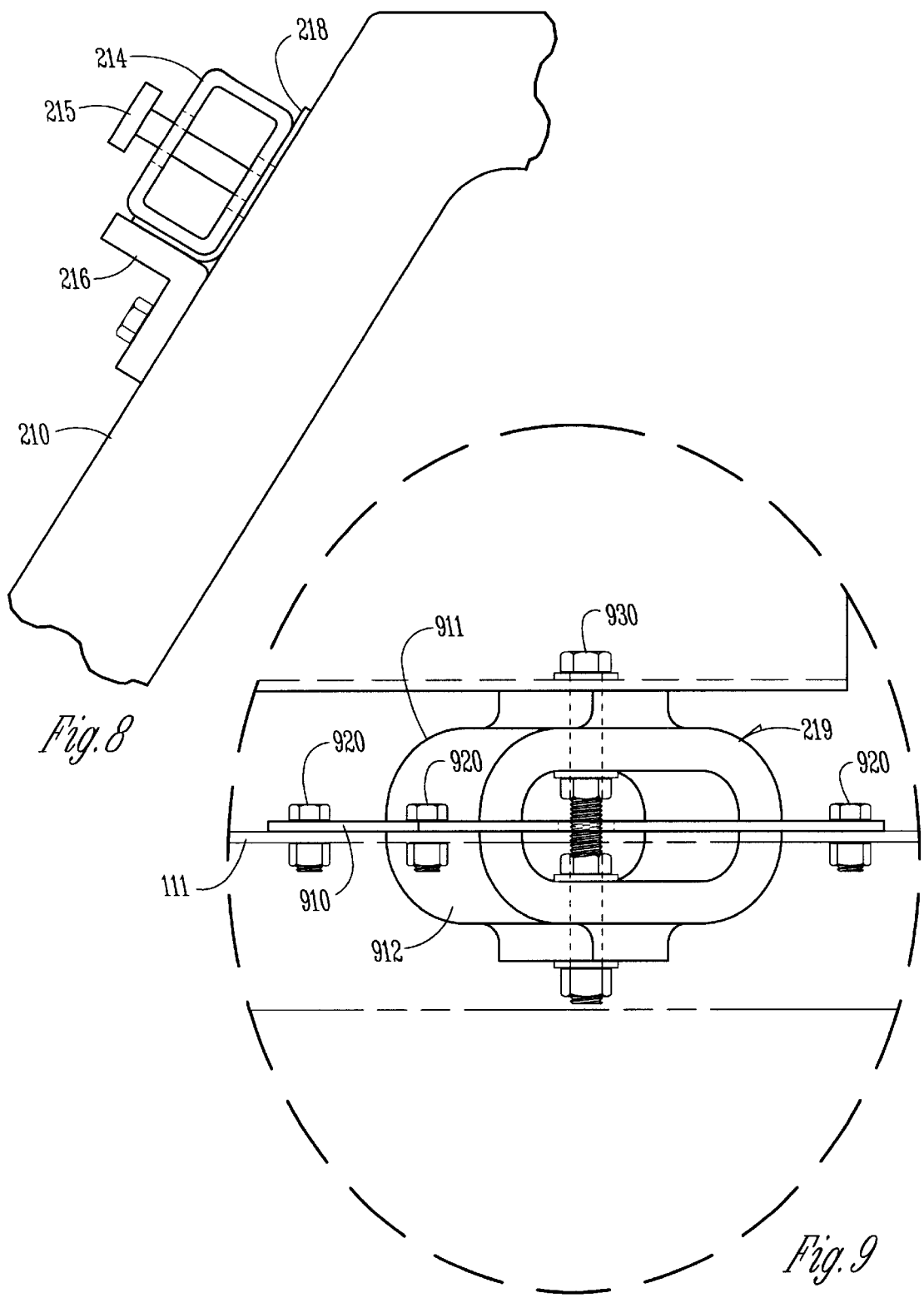
FIG. 8 shows a left-side view of an embodiment of the present invention, connecting member 214 including vibration-absorbing portion 218.
FIG. 9 shows a front view of an embodiment of the present invention, vibraton-absorbing member 219.

In some embodiments, connecting member 214 is a rigid steel tube, rectangular in cross section, that includes at least one vibration-absorbing portion 218 (e.g., a foam-core double sided adhesive tape), and connects the upright portions to one another to absorb vibrations of the upright portions (see FIGS. 3 and 8). In other embodiments (not shown), connecting member 214 includes two almost half-length portions each rigidly attached to the respective upright portions (e.g., by bolting or welding), wherein the two portions do not directly touch, but are attached in the middle to a third overlapping steel piece using at least one vibraton-absorbing portion 218 (e.g., a foam-core double sided adhesive tape). In yet other embodiments (not shown), connecting member 214 includes two slightly more than half-length portions each rigidly attached to the respective upright portions (e.g., by bolting or welding), wherein the two portions do not directly touch, but overlap one another and are attached to one another in the middle using at least one vibraton-absorbing portion 218 (e.g., a foam-core double sided adhesive tape). In still other embodiments (also not shown), connecting member 214 (i.e., a horizontal rectangular tube) is replaced by a diagonal connecting member that runs from table-base portion 213 (e.g., from the midpoint of outside table member 230) to each respective upright portions, wherein each diagonal the two portions do not directly touch, but are attached at one or both ends using at least one vibration-absorbing portion 218 (e.g., a foam-core or visco-elastic double-sided adhesive tape). For example, brackets 216 are bolted to each respective upright portion at a downwardly sloping angle, and one end of each of the diagonal connecting members are attached using a vibration-absorbing portion 218 (e.g., a foam-core double sided adhesive tape); the other end being attached to a suitable bracket attached to the center of member 230. In some such embodiments, one or the other end of such diagonal bars is welded at that end, and the other end is attached through foam tape.

In some embodiments, a shroud 114 attached to base unit 111 substantially encloses the optical table unit 200 without touching optical table unit 200 such that any environmental vibrations or bumping of the outside of shroud 114 is not transmitted to optical table unit 200. Further, shroud 114 includes a horizontal shroud-table surface 115 extending across surface 112 of shroud 114 covering substantial portions of the top of base portion 213, such that if an operator touches shroud-table surface 115, the vibrations are not transmitted to the optical table unit 200. Thus table surface 115 provides a working surface for the operator that is not connected to the optical table 200. The object being scanned is supported by inner table 551, not connected to shroud table 115.

Figure 2:
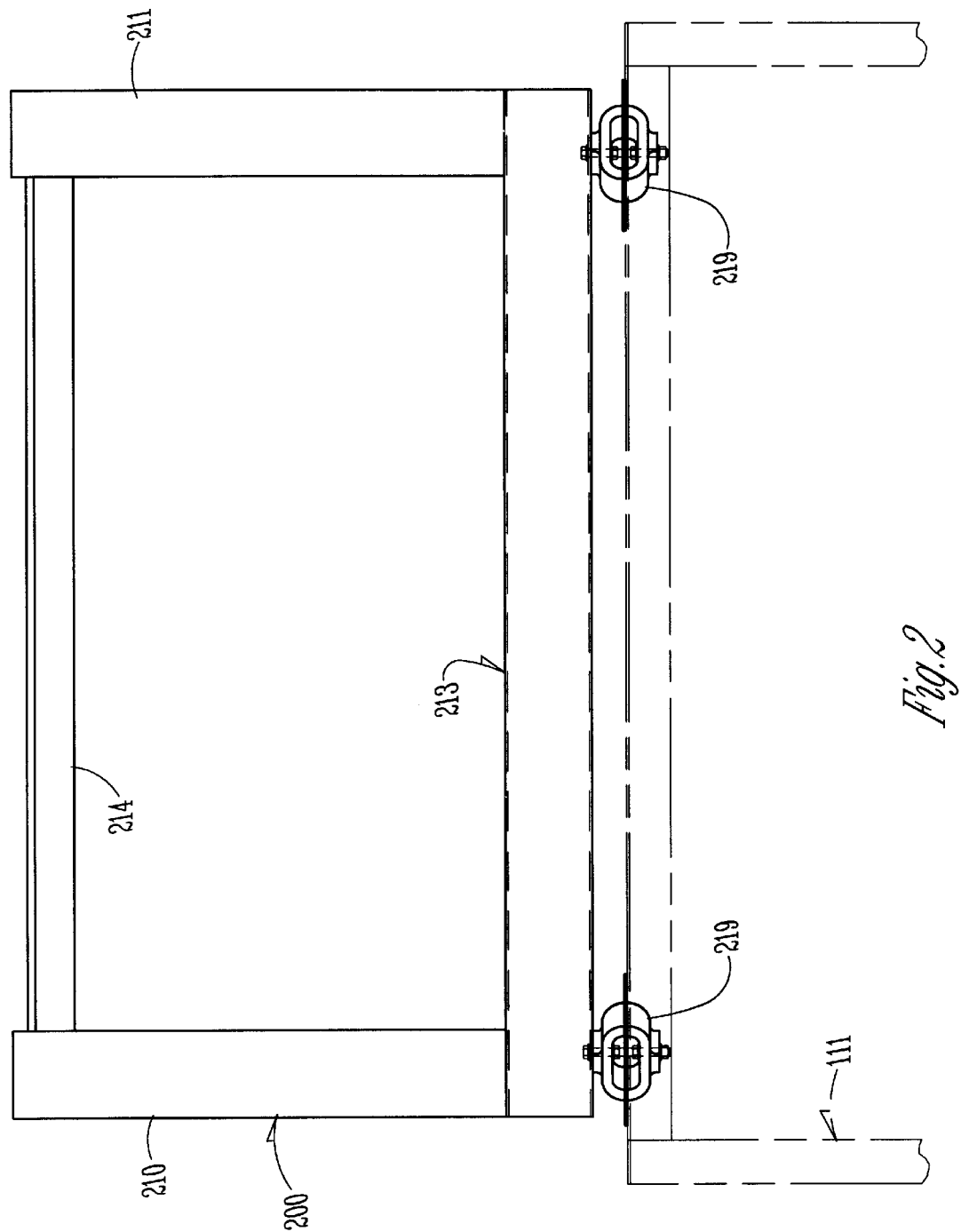
FIG. 2 shows a front view of an embodiment of the present invention, a vibration-isolated optical table unit 200.

FIG. 2 shows a front view of an embodiment of the present invention, a vibration-isolated optical table unit 200. Vibration-isolating mounts 219, one at each of the four corners of optical table unit 200, support optical table unit 200 onto base unit 111, isolating optical table unit 200 from any vibrations from the floor or from bumping of base unit 111 or shroud 114. In some embodiments, vibration-isolating mounts 219 include a rubber-type oval support attached to steel plate 910 (see FIG. 9). Connecting member 214 including at least one vibration-absorbing portion 218 connects the upright portions to one another to absorb vibrations of the upright portions (see FIGS. 3 and 8). Since the upright portions 210 and 211 are welded to base portion 213, alone they would form two tines of a tuning-fork-like structure, and would vibrate. Welding or bolting a cross member in place of connecting member 214 would transmit vibrations from one upright portion to the other. By including a vibration-dampening member 218, any vibrations one the upright portions are dampened/reduced.

In some embodiments, a visco-elastic double-sided adhesive tape is used for vibration-dampening member 218. In some embodiments, a 3M dampening tape, 3M part number 112PO5 (available from Minnesota Mining and Manufacturing Company of St. Paul, Minn.), a 5-mil-thick double-sided adhesive tape is used.

FIG. 3 shows a left-side view of vibration-isolated optical table unit 200. In some embodiments, upright portions 210 and 211 each include a vertical member 310, a base member 313, and a diagonal member 312. In some embodiments, connecting member 214 including vibration-absorbing portion 218 at both ends. In some embodiments, vibration-absorbing portion 218 is a foam core having two adhesive surfaces, and is mounted on two angled surfaces of diagonal member 312 and bracket 216 (which, in one embodiment, is bolted to diagonal member 312), to provide dampening in both vertical and horizontal directions. Bolt 215 does not touch connecting member 214, but rather is centered in an oversized hole in connecting member 214 and not tightened down. The function of bolt 215 is to prevent removal of connecting member 214 if someone were to accidentally pull on it. See FIG. 8 for further details.

Figure 4:
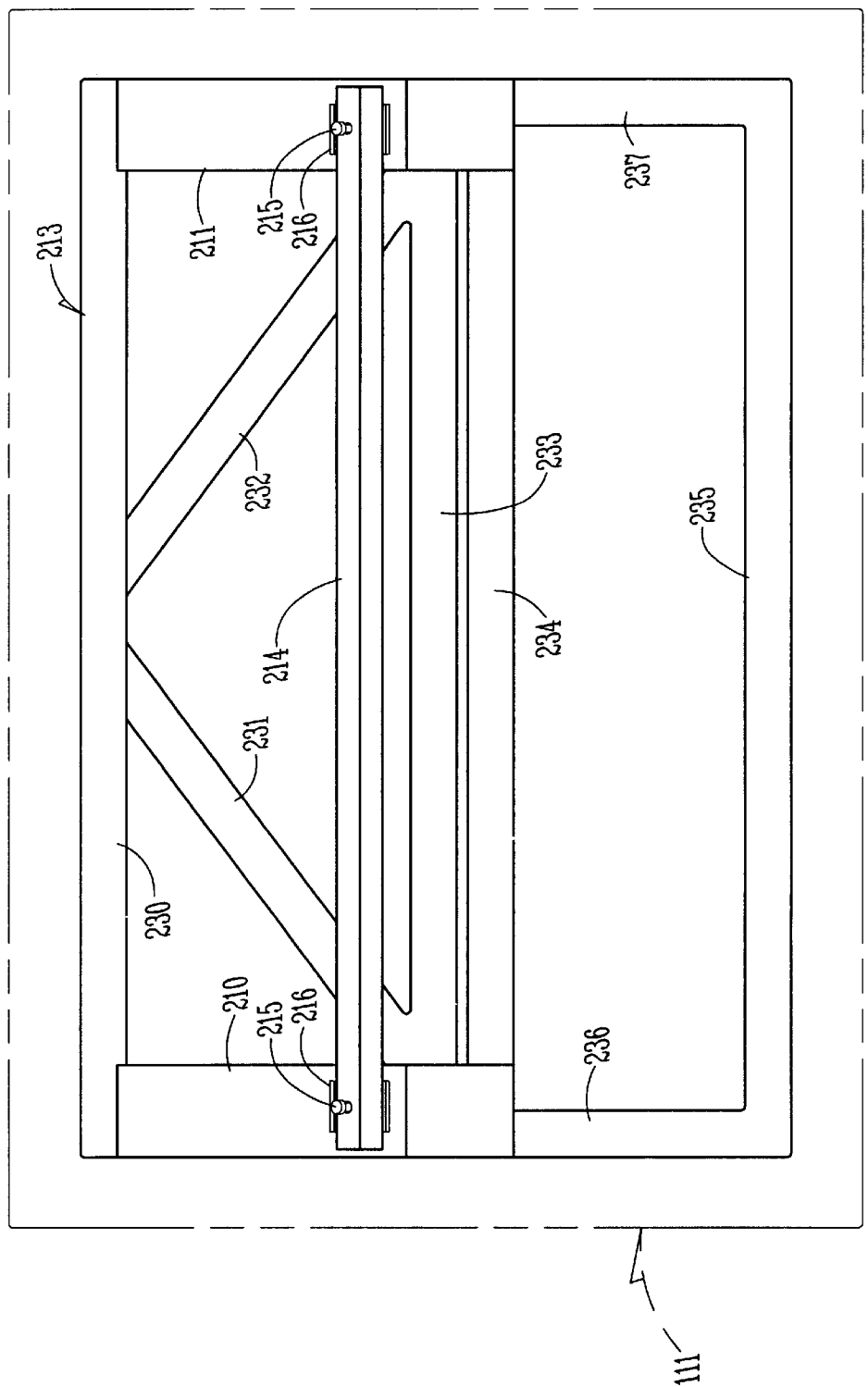
FIG. 4 shows a top view of vibration-isolated optical table unit 200.

FIG. 4 shows a top view of vibration-isolated optical table unit 200. The parts and reference numerals are described above.

Figure 5:
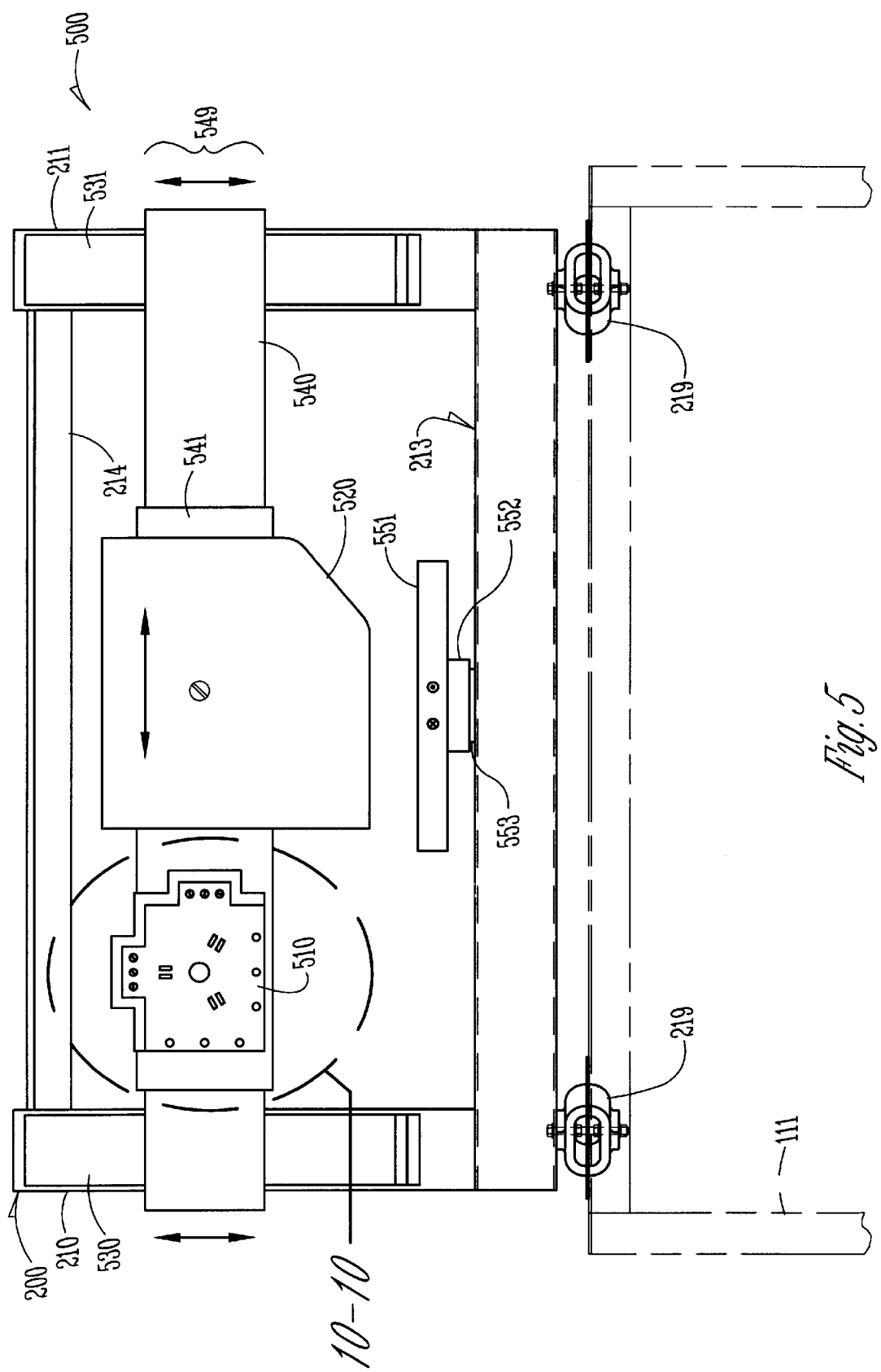
FIG. 5 shows a front view of an embodiment of the present invention, a vibration-isolated scanner unit 500.

FIG. 5 shows a front view of an embodiment of the present invention, a vibration-isolated scanner unit 500. Scanner unit 500 includes a vibration-isolated optical table unit 200 on base unit 111, and having a scanner support 549 coupled to the upright portion 210 via track 530 and vertical shuttle 532, and to upright portion 211 via track 531 and vertical shuttle 533 (also see FIGS. 6 and 7). In some embodiments, horizontal shuttle 541 includes two mounting brackets 510 and 511 that are moved together and each capable of holding a camera or scanning head 520. In some embodiments, a 2D charge-coupled-device camera is attached to the left-side mounting bracket 510, and a 3D scanning head 520 is attached to the right-side mounting bracket 511, in order to facilitate both 2D images and 3D in a single scan operation. Scanning table 551 is attached to horizontal table shuttle 552 that operated on table track 553, which is attached to vibration-isolated unit 200 (i.e., to surface 213). Table 551 is used to move the object being scanned from a load position (out where the user has easy access to load/unload the object(s) being scanned) to one or more scan positions under scanning head 520. In some embodiments, a tray or other fixture holds a plurality of objects in a single row, and shuttle 541 moves head 520 in a single scan path across this row of parts. In other embodiments, two or more scans are used on a single row of parts, where each scan scans a stripe covering one portion of the row of parts, and the next scan covers the next stripe, table 551 moving between scans. In yet other embodiments, one scan covers a stripe including multiple rows of objects. In still other embodiments, two or more scans are used on a tray or fixture of parts having a plurality of rows of parts, where each scan scans a stripe covering one portion of the tray or fixture (one or more rows of parts, or a portion of one row), and the next scan covers the next stripe, table 551 moving between scans until all parts have been scanned. In some embodiments, during each scan operation of scan head 520, table 551 is left at a fixed position, and only moved between scans. Thus, vibration-isolated scanner unit 500 includes scan head 520 and table 551 that are in a fixed relationship to one another, with vibration dampening by connector 214 and vibration-reduction tape 218. Vibration-isolated scanner unit 500 is vibration-isolated from base 111 and shroud 114 (see FIG. 1).

Figure 6:
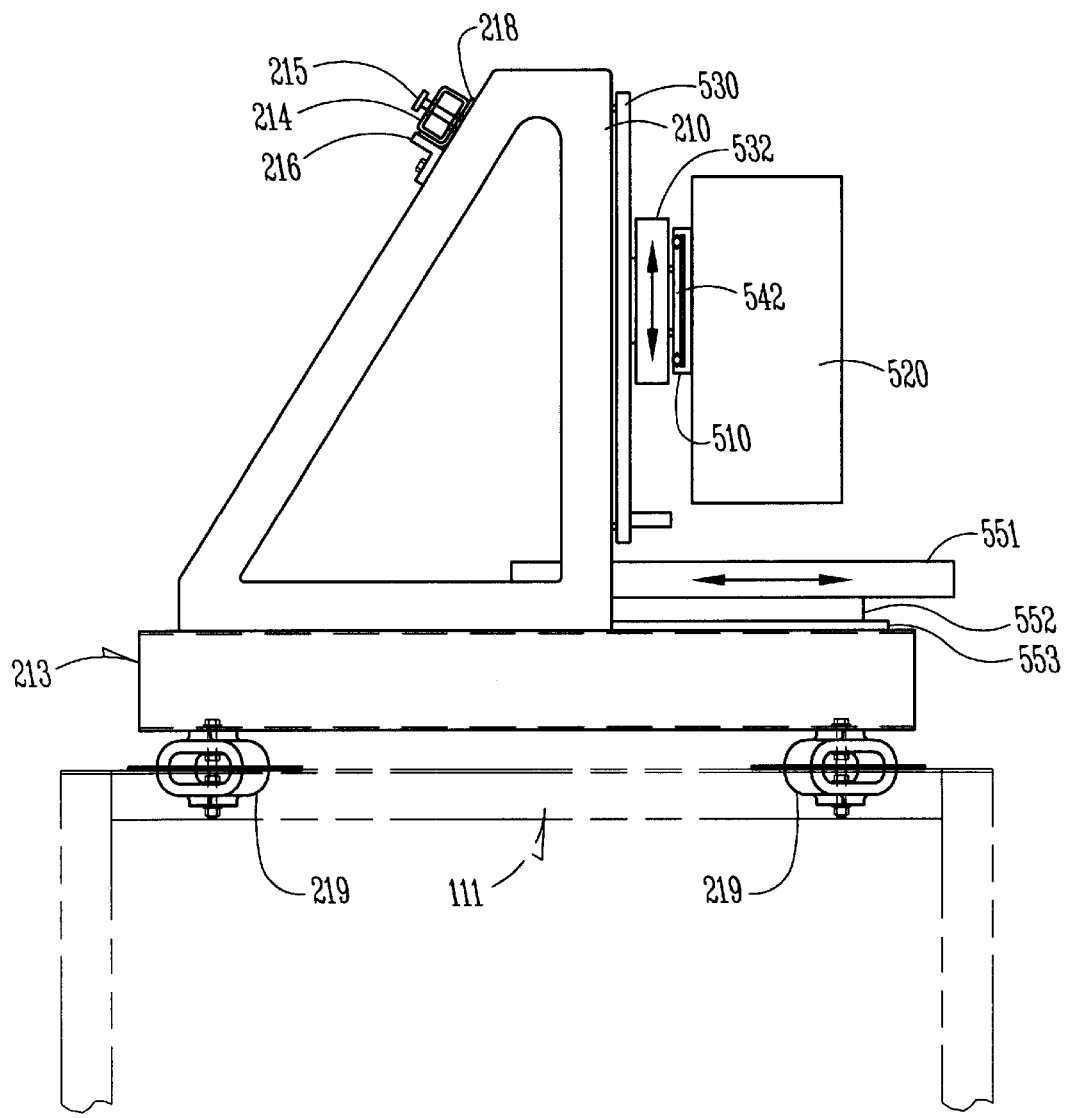
FIG. 6 shows a left-side view of vibration-isolated scanner unit 500.

FIG. 6 shows a left-side view of vibration-isolated scanner unit 500, showing a side view of vertical track 530 and vertical shuttle 532, and an end view of horizontal track 540 and horizontal shuttle 541. In some embodiments, shuttles 541 and 532 and 533 are controlled by precision linear motors. In some embodiments, vertical shuttle 532 and vertical shuttle 533 are moved together to keep horizontal track 540 level, and include an offset detection such that if one vertical shuttle is not aligned with the other (i.e., gets "ahead") that motor will temporarily stop and let the other catch up.

Figure 7:
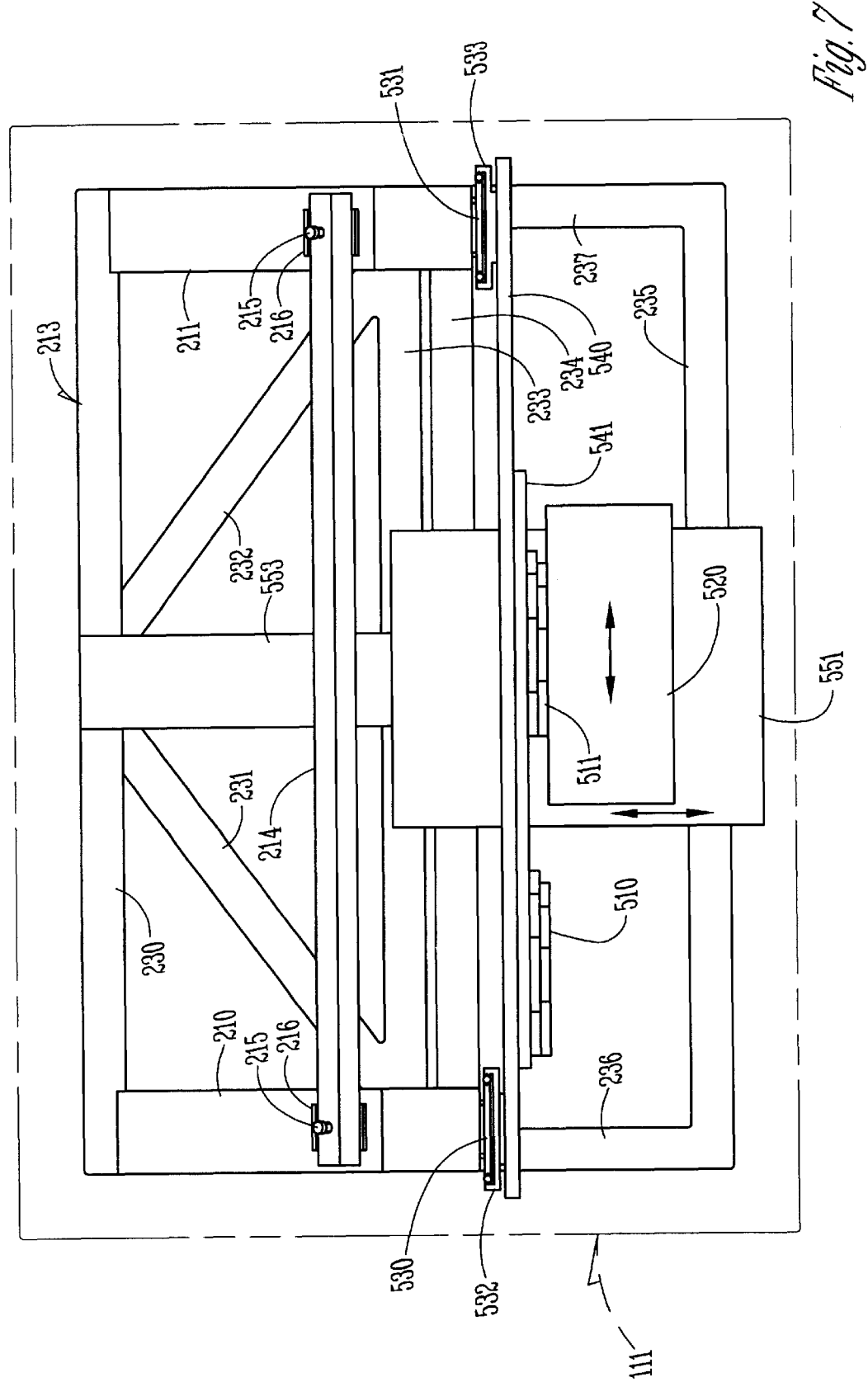
FIG. 7 shows a top view of vibration-isolated scanner unit 500.

FIG. 7 shows a top view of vibration-isolated scanner unit 500.

In some embodiments, an alignment procedure is used to obtain a substantially level horizontal scanning surface, and then assure that the vertical motions are perpendicular to that surface, and that the horizontal motions are parallel to it, in order that the object being scanned is in the desired orientation (both scanner 520 and table 551 flat and parallel to one another and substantially horizontal) for the scanning operation.

FIG. 8 shows a left-side view of an embodiment of the present invention, connecting member 214 including vibration-absorbing portion 218. In some embodiments, connecting member 214 is a rectangular steel pipe, and is attached to vertical support portions 210 and 211 using vibration-absorbing portion 218 at both ends. In some embodiments, vibration-absorbing portion 218 is a foam core double-sided sticky tape having two adhesive surfaces, and is mounted on two angled surfaces of diagonal member 312 and bracket 216 (which, in one embodiment, is bolted to diagonal member 312), to provide dampening in both vertical and horizontal directions. In some embodiments, there is no steel-to-steel contact at either end. Bolt 215 merely keeps bar 214 from being removed, and does not touch connecting member 214, but rather is centered in an oversized hole in connecting member 214 and not tightened down.

FIG. 9 shows a front view of an embodiment of the present invention, vibration-isolation/absorbing member 219. In some embodiments, vibration-isolating mounts 219 include a rubber-type oval support having upper portion 911 and lower portion 912 molded to and through steel plate 910, which is bolted to base 111 using bolts 920. Bolt 930 passes through an oversized hole in steel plate 910, but is attached to the rubber portions using nuts and washers.

Figure 10:
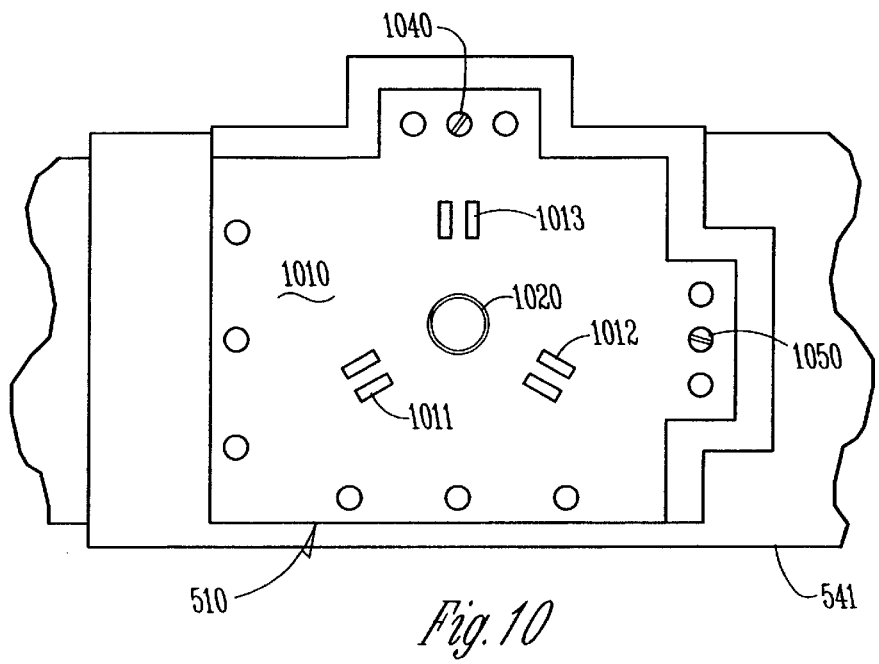
FIG. 10 shows a front view of an embodiment of the present invention, precision-attachment mount 510 on scanner support 514.

FIG. 10 shows a front view of an embodiment of the present invention, precision-attachment mount 510 on scanner support 514. Mount 511 is substantially the same as mount 510. Mount 510 includes three pairs of cylindrical rollers 1011, 1012, and 1013 which mate with respective balls on the mounting surface of the respective camera or scan head 520, to provide precise and repeatable positioning of the scan head to the mount 510 (or 511). Attachment hole 1020 is a spring-loaded female-threaded feature that provides a predetermined force to attach the scan head 520. In some embodiments, the vertical angle is adjusted using adjustment 1040 and the horizontal angle is adjusted using adjustment 1050, in order to zero the pitch and roll of the camera(s) relative to the scan path.

Figure 11:
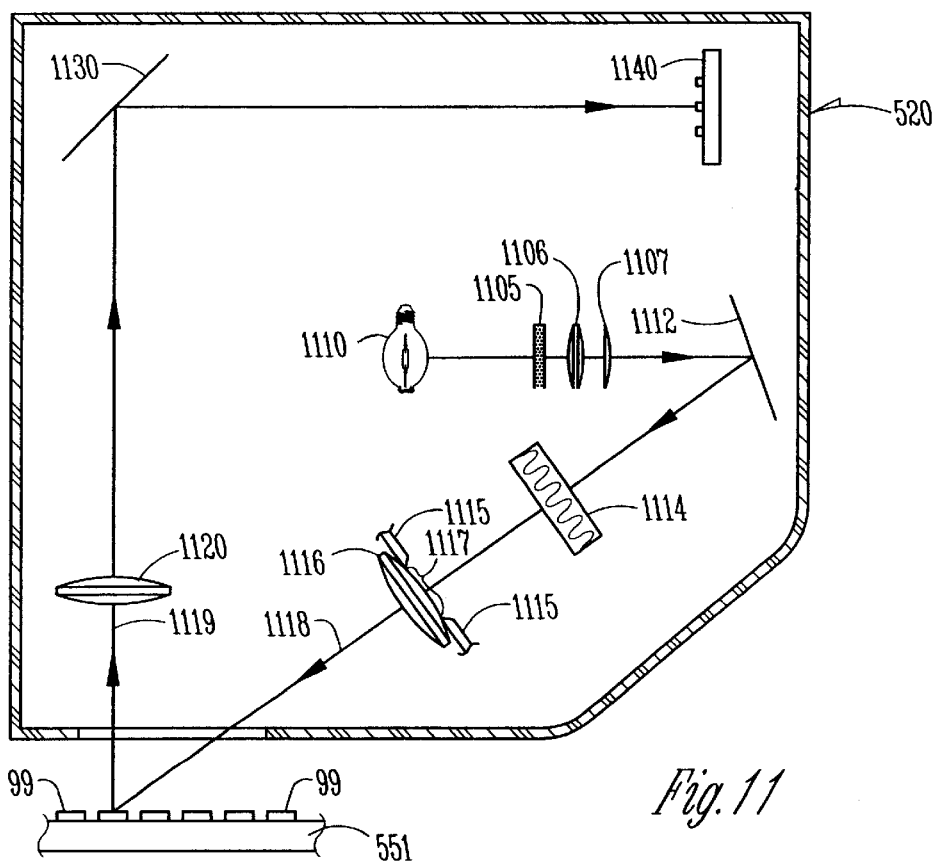
FIG. 11 shows a front view of an embodiment of the present invention, 3D scanner head 520.

FIG. 11 shows a simplified front view of an embodiment of the present invention, 3D scanner head 520. Light from lamp 1110 reflects from mirror 1112, through grating 1114 and telecentric projection lens 1116, and then onto objects 99 being scanned. In some embodiments, objects 99 are placed in a tray or attached to a clamping fixture mounted to or placed on table 551. Scan head 520 is then scanned in a left-to-right or right-to left motion with the parts motionless during the scan, to minimize vibration that would lead to inaccuracies in the 3D measurement. In some embodiments, the reflected light from objects 99 passes through imaging lens 1120, reflects off mirror 1130, and is focussed onto tri-linear imaging CCD 1140. Mirrors 1112 and 1130 help to substantially reduce both the size and weight of scan head (thus reducing the vibration of the moving head and tightening tolerances of the various adjustments made to make the scan path parallel and true), allowing more precise measurements of very small parts and 3D variations of parts.

In some embodiments, the projection light path 1118 includes diffuser 1105, filament lens 1106 and cylindrical lens 1107. The long axis of the filament of lamp 1110 and the long axis of the cylindrical lens 1107 are parallel to one another and perpendicular to the plane of the drawing sheet. In some embodiments, diffuser 1105 is a low-loss holographic diffuser (such as available from Edmund Scientific, 101 East Gloucester Pike, Barrington, N.J./USA 08007-1380; part number J54-493), used to enlarge the apparent size of the filament, and together with cylindrical lens 1107, help the uniformly fill aperture 1117 of lens 1116. In some embodiments, a mask 1115 defines a rectangular aperture 1117 that is longer in a long dimension perpendicular to the drawing sheet than in a width dimension parallel to the drawing sheet. In some embodiments, grating 1114 is a binary grating, and 3D scanner head 520 includes configurations, such as described more fully in copending U.S. Patent Application Ser. No. 09/598,069, entitled "BINARY GRATING AND METHOD FOR GENERATING A MOIRE PATTERN FOR 3D IMAGING" (Attorney Docket No. 139.066US1), filed on even date herewith, and incorporated by reference.

CONCLUSION

In the context of a machine-vision system for inspecting a part, this invention includes method and apparatus to provide high-speed 3D inspection of manufactured parts.

One aspect of the present invention provides a machine-vision system 500 for inspecting an object. System 500 includes a machine-base unit 111, and a table-base portion 213 supported by the base unit 111. At least two upright portions 210 and 211 are connected to the table-base portion 213. A first scanner support 549 is coupled to the upright portions 210 and 211. An imager head 520 is coupled to the scanner support 549, wherein the scanner support 549 moves the imager head 520 in a linear motion to scan the object 99. A connecting member 214 including at least one vibration-absorbing portion 218 connects to the upright portions 210, 211 to absorb vibrations of the upright portions.

In some embodiments, the vibration-absorbing portion 218 includes double-sided adhesive tape.

In some embodiments, the vibration-absorbing portion 218 is mounted with one face of the tape attached to two non-coplanar adjacent surfaces of one of the upright portions (e.g., the upper surfaces of bracket 216 and diagonal member 312), and with an opposite face of the tape attached to corresponding mating surfaces of the connecting member (e.g., the lower surfaces of bar 214).

In some embodiments, the first scanner support includes a support bar having a substantially horizontal long axis, and a scanner shuttle 541, wherein the imager head is attached to the scanner shuttle, and a motor, wherein the motor moves the scanner shuttle relative to the support bar along a first substantially horizontal direction.

In some embodiments, the first scanner support 549 is attached to a plurality of second scanner supports 530, 531, each of the second scanner supports attached to one of the upright portions 210, 211, wherein each one of the second scanner supports moves the support bar 540 of the first scanner support 549 in a substantially vertical direction.

In some embodiments, a linear motor is used to move the scanner shuttle 541.

Some embodiments of the system further include an inspection station 551 that supports the object, and a loader mechanism 552 that moves the inspection station 551 from a first position (toward the front to the machine base table 115) where the object is placed onto the inspection station, to a second position where the object remains unmoving while the imager head is moved for a scanning operation, and wherein the inspection station 551 is attached to the table-base portion 213.

Some embodiments of the system further include one or more isolation mounts between the machine base unit and the table-base portion to reduce transmission of vibration between the machine base unit and the inspection station.

Some embodiments of the system further include a computer coupled to the imager head, and a comparator coupled to the computer, wherein the comparator compares one or more characteristics of the acquired three-dimensional object geometry data with an intended predetermined geometry to produce a signal indicative of any object geometry departure of an actual object geometry from the intended predetermined geometry.

Some embodiments of the system further include one or more mounts attached to the scanner shuttle of the first scanner support, each imager mount including a first angle adjustment and a second angle adjustment usable to adjust the imager head relative to a line parallel to the direction of scanning and relative to a line perpendicular to the direction of scanning.

Another aspect of the present invention provides a method of reducing vibration in a three-dimensional scanning apparatus used to determine a geometry of an object having at least one surface to be measured, the scanning apparatus having two or more upright portions and a scanning mechanism coupled the upright portions for moving an imaging head. The method includes supporting the scanning mechanism on the upright portions, dampening vibrations of the upright portions, scanning the imaging head relative to the object, receiving image signals representing a three-dimensional geometry of the object into a computer, and calculating with the computer object-geometry data representing three-dimensional geometry of the object.

In some embodiments of the method, dampening vibrations includes attaching a rigid connecting member to each upright portion using foam-core double-sided adhesive tape.

In some embodiments of the method, the attaching includes mounting with one face of the tape attached to two non-coplanar adjacent surfaces of one of the upright portions, and with an opposite face of the tape attached to corresponding mating surfaces of the connecting member.

In some embodiments of the method, the scanning function includes providing a scan path having a substantially horizontal long axis, and moving a scanning shuttle along the scan path, wherein the imager head is attached to the scanner shuttle.

Some embodiments of the method further include fixing the scan path to a plurality of height-adjustment supports, each of the height-adjustment supports fixed to one of the upright portions, and moving each one of the height-adjustment supports to move the scan path in a substantially vertical direction.

In some embodiments of the method, the moving includes moving using a linear motor.

Some embodiments of the method further include supporting the object at an inspection station, and moving the inspection station from a first position where the object is placed onto the inspection station to a second position where the object remains unmoving while the imager head is moved for a scanning operation.

Some embodiments of the method further include isolating vibrations from being transmitted from a floor to the inspection station.

Some embodiments of the method further include comparing one or more characteristics of the calculated three-dimensional object geometry data with an intended predetermined geometry to produce a signal indicative of any object geometry departure of an actual object geometry from the intended predetermined geometry, and controlling a manufacturing process used for the object based on the signal.

Some embodiments of the method further include attaching the imager head to the scanner shuttle, and adjusting a first angle and a second angle to adjust the imager head relative to a line parallel to the direction of scanning and relative to a line perpendicular to the direction of scanning It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A machine-vision system for inspecting an object, comprising:
    a machine-base unit;
    a table-base portion supported by the base unit;
    at least two upright portions connected to the table-base portion;
    a first scanner support coupled to the upright portions;
    an imager head coupled to the scanner support, wherein the scanner support moves the imager head in a linear motion to scan the object; and
    a connecting member including at least one vibration-absorbing portion, wherein the connecting member is connected to the upright portions to reduce vibrations of the upright portions.

2. The machine-vision system of claim 1, wherein the vibration-absorbing portion comprises double-sided adhesive tape.

3. The machine-vision system of claim 1, wherein the vibration-absorbing portion comprising double-sided adhesive tape is mounted with one face of the tape attached to two non-coplanar adjacent surfaces of one of the upright portions, and with an opposite face of the tape attached to corresponding mating surfaces of the connecting member.

4. The machine-vision system of claim 1, wherein the first scanner support includes:
    a support bar having a substantially horizontal long axis;
    a scanner shuttle, wherein the imager head is attached to the scanner shuttle; and
    a motor, wherein the motor moves the scanner shuttle relative to the support bar along a first substantially horizontal direction.

5. The machine-vision system of claim 4, wherein the first scanner support is attached to a plurality of second scanner supports, each of the second scanner supports attached to one of the upright portions, wherein each one of the second scanner supports moves the support bar of the first scanner support in a substantially vertical direction.

6. The machine-vision system of claim 4, wherein the motor is a linear motor.

7. The machine-vision system of claim 1, further comprising:
    an inspection station that supports the object; and
    a loader mechanism that moves the inspection station from a first position where the object is placed onto the inspection station to a second position where the object remains unmoving while the imager head is moved for a scanning operation, and wherein the inspection station is attached to the table-base portion.

8. The machine-vision system of claim 1, further comprising one or more isolation mounts between the machine base unit and the table-base portion to reduce transmission of vibration between the machine base unit and the inspection station.

9. The machine-vision system of claim 1, further comprising:

a computer coupled to the imager head; and
    a comparator coupled to the computer, wherein the comparator compares one or more characteristics of the acquired three-dimensional object geometry data with an intended predetermined geometry to produce a signal indicative of any object geometry departure of an actual object geometry from the intended predetermined geometry.

10. The machine-vision system of claim 4, further comprising:
    one or more mounts attached to the scanner shuttle of the first scanner support, each imager mount including a first angle adjustment and a second angle adjustment usable to adjust the imager head relative to a line parallel to the direction of scanning and relative to a line perpendicular to the direction of scanning.

11. A method of reducing vibration in a three-dimensional scanning apparatus used to determine a geometry of an object having at least one surface to be measured, the scanning apparatus having two or more upright portions and a scanning mechanism coupled the upright portions for moving an imaging head, the method comprising:
    (a) supporting the scanning mechanism on the upright portions;
    (b) connecting a member, the member having at least one rigid portion and at least one vibration-absorbing portion, to each upright portion and dampening vibrations of the upright portions;
    (c) scanning the imaging head relative to the object;
    (d) receiving image signals representing a three-dimensional geometry of the object into a computer; and
    (e) calculating with the computer object-geometry data representing three-dimensional geometry of the object.

12. The method of claim 11, wherein the connecting a member and dampening vibrations comprises attaching a rigid connecting member to each upright portion using foam-core double-sided adhesive tape.

13. The method of claim 12, wherein the attaching includes mounting with one face of the tape attached to two noscoplanar adjacent surfaces of one of the upright portions, and with an opposite face of the tape attached to corresponding mating surfaces of the connecting member.

14. The method of claim 11, wherein the scanning function includes:
    (f) providing a scan path having a substantially horizontal long axis; and
    (g) moving a scanning shuttle along the scan path, wherein the imager head is attached to the scanner shuttle.

15. The method of claim 14, further comprising:
    (h) fixing the scan path to a plurality of height-adjustment supports, each of the height-adjustment supports fixed to one of the upright portions; and
    i) moving each one of the height-adjustment supports to move the scan path in a substantially vertical direction.

16. The method of claim 14, wherein the moving includes moving using a linear motor.

17. The method of claim 11, further comprising.
    (j) supporting the object at an inspection station; and
    (k) moving the inspection station from a first position where the object is placed onto the inspection station to a second position where the object remains unmoving while the imager head is moved for a scanning operation.

18. The method of claim 11, further comprising
(l) isolating vibrations from being transmitted from a floor to the inspection station.

19. The method of claim 11, further comprising:
(m) comparing one or more characteristics of the calculated three-dimensional object geometry data with an intended predetermined geometry to produce a signal indicative of any object geometry departure of an actual object geometry from the intended predetermined geometry; and
(n) controlling a manufacturing process used for the object based on the signal.

20. The method of claim 14, further comprising:
(o) attaching the imager head to the scanner shuttle; and
(p) adjusting a first angle and a second angle to adjust the imager head relative to a line parallel to the direction of scanning and relative to a line perpendicular to the direction of scanning.

21. A machine-vision system for inspecting an objects comprising:
a light source that provides projected light on the object;
an imager, wherein the imager generates signals from the light representative of three-dimensional object-geometry data of the object;
a scanning mechanism that moves the imager relative to the object; and
means for reducing vibration of the imager during a scanning operation, including upright portion means, connecting means coupled to the upright means, and dampening means coupled to the connecting means to reduce vibration of the upright means.

22. The machine-vision system of claim 21, further comprising:
means for reducing vibration of both the object and the imager during a scanning operation.

* * * * *